(12) United States Patent
Fisher

(10) Patent No.: US 8,492,692 B2
(45) Date of Patent: Jul. 23, 2013

(54) UNMANNED AERIAL VEHICLE BASED SONAR BUOY

(75) Inventor: Jeremy F. Fisher, East Falmouth, MA (US)

(73) Assignee: Elbit Systems of America, LLC, Fort Worth, TX (US)

( * ) Notice: Subject to any disclaimer, the term of this patent is extended or adjusted under 35 U.S.C. 154(b) by 91 days.

(21) Appl. No.: 13/097,394

(22) Filed: Apr. 29, 2011

(65) Prior Publication Data
US 2012/0138727 A1 Jun. 7, 2012

Related U.S. Application Data

(60) Provisional application No. 61/330,205, filed on Apr. 30, 2010.

(51) Int. Cl.
| | |
|---|---|
| F42B 12/56 | (2006.01) |
| F42B 15/01 | (2006.01) |
| F42B 15/08 | (2006.01) |
| H04B 1/59 | (2006.01) |
| F42B 15/00 | (2006.01) |
| H04B 1/00 | (2006.01) |

(52) U.S. Cl.
USPC ......... 244/3.15; 244/3.1; 244/75.1; 244/76 R; 244/175; 244/4 R; 244/13; 89/1.8; 89/1.816; 367/2; 367/3; 367/4

(58) Field of Classification Search
USPC .................... 244/3.1–3.3, 4 R, 13, 14, 117 R, 244/137.1, 138 R, 75.1, 76 R, 175, 189, 190; 89/1.11, 1.8, 1.816; 367/2–6, 131, 134
See application file for complete search history.

(56) References Cited

U.S. PATENT DOCUMENTS

| | | | | |
|---|---|---|---|---|
| 3,368,480 A | * | 2/1968 | Payne et al. ..................... | 367/4 |
| 3,646,505 A | * | 2/1972 | Kirby ................................ | 367/4 |
| 3,745,956 A | * | 7/1973 | Bertheas ..................... | 244/3.15 |
| 3,944,964 A | * | 3/1976 | Loeser et al. .................... | 367/4 |
| 3,978,790 A | * | 9/1976 | Sandelius .................... | 244/3.25 |
| 3,986,159 A | * | 10/1976 | Horn ................................. | 367/4 |

(Continued)

FOREIGN PATENT DOCUMENTS
WO    WO 02/32762 A2    4/2002

OTHER PUBLICATIONS

Notification of Transmittal of the International Search Report and the Written Opinion of the International Searching Authority, or the Declaration; International Application No. PCT/US2011/034543; International Filing Date: Apr. 29, 2011.

*Primary Examiner* — Bernarr Gregory
(74) *Attorney, Agent, or Firm* — Conley Rose, P.C.

(57) ABSTRACT

A sonar buoy includes a fuselage having a tube-like shape, one or more wings coupled to the fuselage, an engine coupled to the fuselage and operable to propel the sonar buoy through flight, and a guidance computer operable to direct the sonar buoy to a predetermined location. The sonar buoy further includes a sonar detachably coupled to the fuselage and forming at least a part of the fuselage, and a rocket motor detachably coupled to the fuselage. The one or more wings are operable to be folded into a position to allow the sonar buoy to be disposed within a launch tube coupled to a vehicle and to automatically deploy to an appropriate position for flight after the sonar buoy is launched from the launch tube. The rocket motor propels the sonar buoy from the launch tube and detaches from the fuselage after launch.

20 Claims, 3 Drawing Sheets

U.S. PATENT DOCUMENTS

| | | | |
|---|---|---|---|
| 4,215,630 A * | 8/1980 | Hagelberg et al. | 89/1.11 |
| 5,012,717 A * | 5/1991 | Metersky et al. | 89/1.11 |
| 5,069,109 A * | 12/1991 | Lavan, Jr. | 89/1.11 |
| 5,456,427 A * | 10/1995 | Greenhalgh | 244/138 R |
| 5,566,908 A * | 10/1996 | Greenhalgh | 244/138 R |
| 5,615,847 A | 4/1997 | Bourlett | |
| 5,646,366 A * | 7/1997 | O'Connell | 89/1.11 |
| 5,792,950 A * | 8/1998 | Shonting | 367/134 |
| 5,973,994 A * | 10/1999 | Woodall | 367/4 |
| 6,056,237 A * | 5/2000 | Woodland | 244/3.15 |
| 6,082,675 A * | 7/2000 | Woodall et al. | 244/3.23 |
| 6,260,797 B1 | 7/2001 | Palmer | |
| 6,679,454 B2 * | 1/2004 | Olsen et al. | 244/137.1 |
| 7,262,395 B2 * | 8/2007 | Bilyk et al. | 244/14 |
| 7,793,606 B2 * | 9/2010 | Olivier et al. | 244/3.28 |
| 7,982,662 B2 * | 7/2011 | Shaffer | 244/3.1 |
| 2007/0018033 A1 | 1/2007 | Fanucci et al. | 244/3.27 |
| 2008/0035786 A1* | 2/2008 | Bilyk et al. | 244/13 |
| 2010/0012774 A1 | 1/2010 | Fanucci et al. | |

* cited by examiner

US 8,492,692 B2

UNMANNED AERIAL VEHICLE BASED SONAR BUOY

CROSS-REFERENCE TO RELATED APPLICATION

This application claims the benefit of priority under 35 U.S.C. §119(e) of U.S. Provisional Application Ser. No. 61/330,205, entitled "Unmanned Aerial Vehicle Based Sonar Buoy", filed Apr. 30, 2010.

TECHNICAL FIELD OF THE INVENTION

The present invention relates generally to sonar devices and more specifically to an unmanned aerial vehicle based sonar buoy.

BACKGROUND OF THE INVENTION

Certain manned warships can deploy sonar buoys around a search area to help with the location of a submarine. Sonar buoys float in the sea and either listen for submarine noise (passive buoys) or transmit sonar pulses and then listen for the return (active buoys).

SUMMARY OF THE INVENTION

In accordance with the present invention, the disadvantages and problems associated with deploying sonar buoys have been substantially reduced or eliminated.

According to one embodiment of the present invention, a sonar buoy includes a fuselage having a tube-like shape, one or more wings coupled to the fuselage, an engine coupled to the fuselage and operable to propel the sonar buoy through flight, and a guidance computer operable to direct the sonar buoy to a predetermined location. The sonar buoy further includes a sonar detachably coupled to the fuselage and forming at least a part of the fuselage, and a rocket motor detachably coupled to the fuselage. The one or more wings are operable to be folded into a position to allow the sonar buoy to be disposed within a launch tube coupled to a vehicle and to automatically deploy to an appropriate position for flight after the sonar buoy is launched from the launch tube. The rocket motor propels the sonar buoy from the launch tube and detaches from the fuselage after launch.

Certain embodiments of the disclosure may provide one or more advantages. An advantage of one embodiment may be that a sonar buoy may be incorporated into the body of an unmanned aerial vehicle and deployed by being launched from a tube. Another advantage of certain embodiments may be that a sonar buoy may be launched from a surface vehicle and fly to a predetermined location.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Embodiments of the present invention and its advantages are best understood by referring to FIGS. 1 through 4 of the drawings, like numerals being used for like and corresponding parts of the various drawings.

In some cases, sonar buoys may be deployed by being dropped from a helicopter or Anti-Submarine Warfare (ASW) aircraft. In other cases, a helicopter may lower an active dipping sonar into water while hovering at a set location. In some cases, sonar buoys may be dropped for one time use, following which they sink.

The teachings of the disclosure recognize that it would be desirable to provide an unmanned aerial vehicle based sonar buoy (active or passive) that may be deployed from a surface vehicle to a specified remote location on an "as needed" basis. FIGS. 1 through 4 below illustrate an unmanned aerial vehicle based sonar buoy and system according to the teachings of the disclosure.

Figure 1:
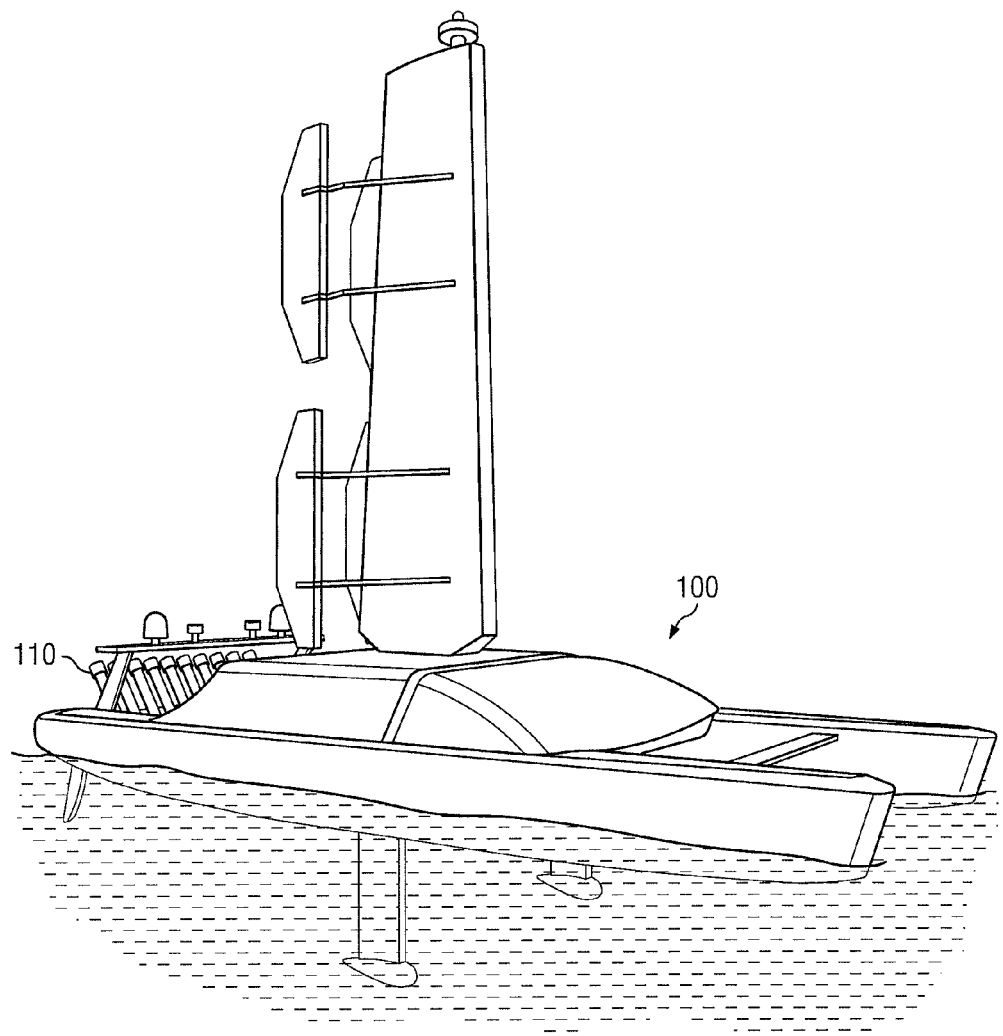
FIGS. 1 and 2 illustrate a system for deploying an unmanned aerial vehicle based sonar buoy, according to certain embodiments.
Figure 2:
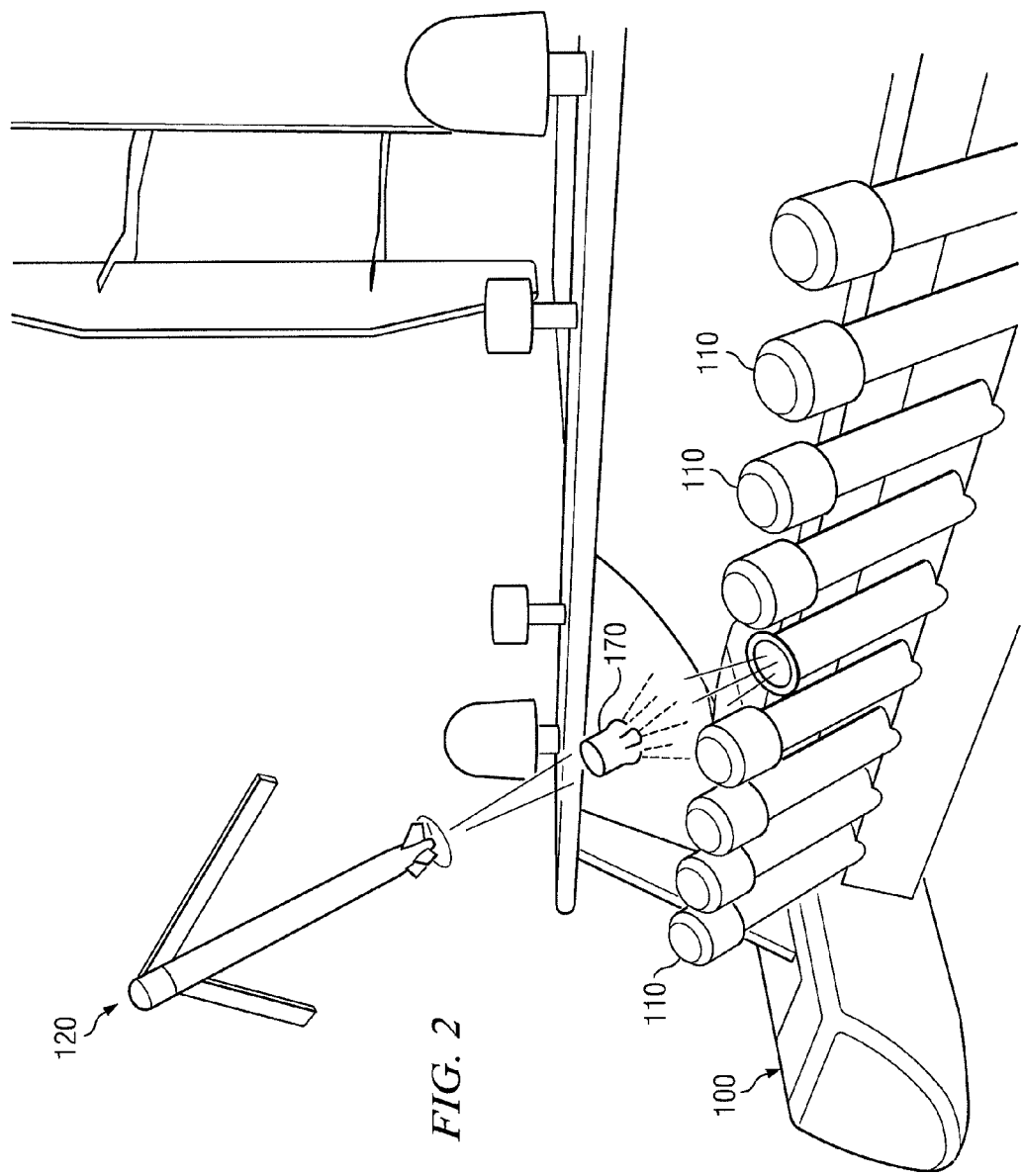

FIGS. 1 and 2 illustrate a surface vehicle 100 according to certain embodiments. Surface vehicle 100 includes one or more launch tubes 110. Launch tubes 110 may be utilized to deploy unmanned aerial vehicle based sonar buoy 120 described below.

In some embodiments, surface vehicle 100 may be any vehicle capable of traveling on water. In one embodiment, surface vehicle 100 may be a manned ship, warship, boat, and the like. In some embodiments, surface vehicle 100 may be an unmanned surface vehicle (USV). Surface vehicle 100 may be any size capable of carrying at least one launch tube 110. Surface vehicle 100 may be propelled by any propulsion means, including, but not limited to, electric motor(s), gasoline/diesel motor(s), and/or wind.

Figure 3:
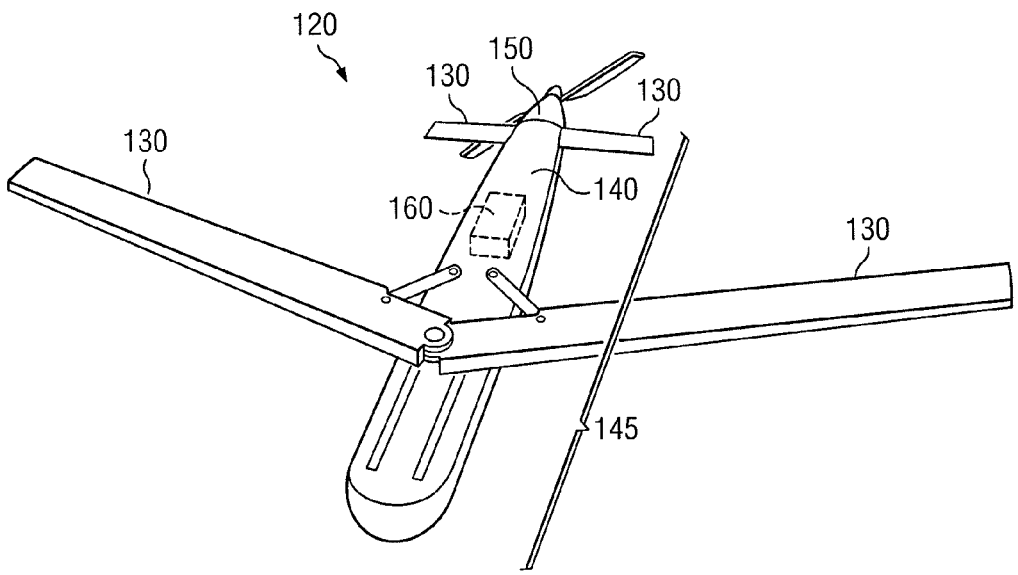
FIGS. 3 and 4 illustrate an unmanned aerial vehicle based sonar buoy, according to certain embodiments.

FIG. 3 illustrates an unmanned aerial vehicle based sonar buoy 120, according to certain embodiments. Unmanned aerial vehicle based sonar buoy 120 includes wings 130, sonar 140, a fuselage 145, an engine 150, and a guidance computer 160. Wings 130 and engine 150 may be coupled to sonar 140 and/or fuselage 145. Unmanned aerial vehicle based sonar buoy 120 may be deployed by surface vehicle 100 via launch tubes 110.

Wings 130 may be any appropriate wings to allow unmanned aerial vehicle based sonar buoy 120 to fly once launched from launch tubes 110. In some embodiments, wings 130 fold into a shape to allow unmanned aerial vehicle based sonar buoy 120 to fit into launch tubes 110. Wings 130 may then automatically deploy to the appropriate position for flight immediately after unmanned aerial vehicle based sonar buoy 120 is launched from launch tubes 110. In certain embodiments, wings 130 remain attached to unmanned aerial vehicle based sonar buoy 120 once it lands in water. In other embodiments, wings 130 may automatically detach from unmanned aerial vehicle based sonar buoy 120 once it lands in water.

Sonar 140 may be any appropriate active or passive sonar. Sonar 140 is any appropriate shape that will allow unmanned aerial vehicle based sonar buoy 120 to fit in launch tubes 110. In some embodiments, sonar 140 is tube-shaped and forms some or all of fuselage 145 of unmanned aerial vehicle based sonar buoy 120. In some embodiments, sonar 140 may be disposed within fuselage 145.

Engine 150 is any appropriate engine to propel unmanned aerial vehicle based sonar buoy 120 through flight. In some embodiments, engine 150 is an electric engine. In other embodiments, engine 150 is a gasoline engine. Engine 150 is coupled to a propeller that is any appropriate shape to allow unmanned aerial vehicle based sonar buoy 120 to fit inside launch tubes 110. In certain embodiments, engine 150 remains attached to unmanned aerial vehicle based sonar buoy 120 once it lands in water. In other embodiments, engine 150 may automatically detach from unmanned aerial vehicle based sonar buoy 120 once it lands in water.

In operation, unmanned aerial vehicle based sonar buoy 120 is stored in a launch tube 110 on surface vehicle 100 prior to being deployed. When it is desired to deploy unmanned aerial vehicle based sonar buoy 120, unmanned aerial vehicle based sonar buoy 120 is launched from launch tube 110 using any appropriate means. In one embodiment, for example, a small rocket motor 170 may be utilized to expel unmanned aerial vehicle based sonar buoy 120 from launch tube 110. In some embodiments, rocket motor 170 may be detachably coupled to unmanned aerial vehicle based sonar buoy 120 and may detach from unmanned aerial vehicle based sonar buoy 120 immediately after being launched from launch tube 110.

Immediately after being launched from launch tube 110, wings 130 of unmanned aerial vehicle based sonar buoy 120 may unfold and engine 150 starts. Unmanned aerial vehicle based sonar buoy 120 is then airborne. Guidance computer 160, which may include a Global Positioning System (GPS) or any other navigational system, guides unmanned aerial vehicle based sonar buoy 120 to a predetermined destination by controlling wings 130, engine 150, and other control surfaces of unmanned aerial vehicle based sonar buoy 120. Guidance computer 160 may also include a transceiver for receiving commands from an operator and for sending information back to the operator.

Once unmanned aerial vehicle based sonar buoy 120 arrives at the predetermined location, it may proceed to land in the water. Once in the water, sonar 140 of unmanned aerial vehicle based sonar buoy 120 functions as a typical active or passive sonar in order to locate objects under the water such as submarines. In some embodiments, wings 130 and engine 150 may automatically detach from sonar 140 once unmanned aerial vehicle based sonar buoy 120 lands in the water so as to not hinder sonar 140.

Figure 4:
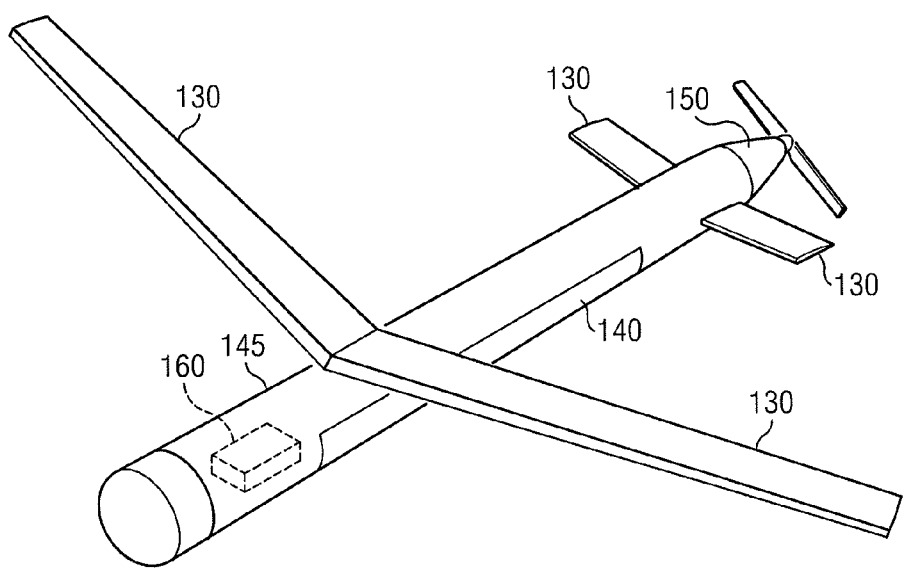

In some embodiments, unmanned aerial vehicle based sonar buoy 120 may include a mechanism by which to drop sonar 140 into the water at the predetermined location. For example, as illustrated in FIG. 4, wings 130, engine 150, and guidance computer 160 may be attached to fuselage 145 that is separate from sonar 140. Sonar 140 may be detachably coupled to fuselage 145 so that it may detach and fall into the water on command. In some embodiments, unmanned aerial vehicle based sonar buoy 120 may crash into the water and sink once dropping sonar 140. In other embodiments, unmanned aerial vehicle based sonar buoy 120 may return to surface vehicle 110 once dropping sonar 140 into the water.

In some embodiments, unmanned aerial vehicle based sonar buoy 120 may be launched from a launch tube 110 that is coupled to a stationary object on land, or any vehicle other than surface vehicle 100. For example, in some embodiments launch tube 110 may be coupled to an aircraft. In other embodiments, launch tube 110 may be coupled to a fixed object on land. In other embodiments, launch tube 110 may be coupled to a vehicle that travels on land such as trucks, cars, tanks, military vehicles, and the like. The disclosure anticipates unmanned aerial vehicle based sonar buoy 120 being launched from any suitable launch tube 110 regardless of its location.

Modifications, additions, or omissions may be made to the systems and apparatuses disclosed herein without departing from the scope of the invention. The components of the systems and apparatuses may be integrated or separated. For example, the guidance computer and the navigational system may be integrated or separated. Moreover, the operations of the systems and apparatuses may be performed by more, fewer, or other components. For example, the operations of guidance computer 160 and sonar 140 may be performed by one component, or the operations of guidance computer and sonar 140 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. For example, the method of launching unmanned aerial vehicle based sonar buoy 120 may include additional steps such as downloading flight information to unmanned aerial vehicle based sonar buoy 120. Additionally, steps may be performed in any suitable order. For example, engine 150 may be started prior to launching unmanned aerial vehicle based sonar buoy 120.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A sonar buoy comprising:
a fuselage having a tube-like shape;
one or more wings coupled to the fuselage and operable to be folded into a position to allow the sonar buoy to be disposed within a launch tube coupled to a vehicle, the one or more wings further operable to automatically deploy to an appropriate position for flight after the sonar buoy is launched from the launch tube;
an engine coupled to the fuselage and operable to propel the sonar buoy through flight;
a guidance computer operable to direct the sonar buoy to a predetermined location;
a sonar coupled to the fuselage; and
a rocket motor detachably coupled to the fuselage and operable to:
propel the sonar buoy from the launch tube; and
detach from the fuselage after propelling the sonar buoy from the launch tube.

2. The sonar buoy of claim 1, wherein the sonar comprises an active sonar.

3. The sonar buoy of claim 1, wherein the sonar comprises a passive sonar.

4. The sonar buoy of claim 1, wherein the one or more wings are detachably coupled to the fuselage and operable to automatically detach from the fuselage after the sonar buoy lands in water.

5. The sonar buoy of claim 1, wherein the sonar is operable to detach from the fuselage on command.

6. The sonar buoy of claim 1, wherein the vehicle comprises a vehicle that travels on water.

7. A sonar buoy comprising:
a fuselage having a tube-like shape;
one or more wings coupled to the fuselage and operable to be folded into a position to allow the sonar buoy to be disposed within a launch tube, the one or more wings further operable to automatically deploy to an appropriate position for flight after the sonar buoy is launched from the launch tube;
an engine operable to propel the sonar buoy through flight; and
a sonar coupled to the fuselage.

8. The sonar buoy of claim 7, further comprising a guidance computer operable to direct the sonar buoy to a predetermined location.

9. The sonar buoy of claim 7, wherein the sonar comprises an active sonar.

10. The sonar buoy of claim 7, wherein the sonar comprises a passive sonar.

11. The sonar buoy of claim 7, wherein the one or more wings are detachably coupled to the fuselage and are operable to automatically detach from the fuselage after the sonar buoy lands in water.

12. The sonar buoy of claim 7, wherein the sonar is detachably coupled to the fuselage, the sonar operable to detach from the fuselage on command.

13. The sonar buoy of claim 7, further comprising a rocket motor detachably coupled to the sonar buoy and operable to:
propel the sonar buoy from the launch tube; and
detach from the sonar buoy after propelling the sonar buoy from the launch tube.

14. A system comprising:
a launch tube coupled to a vehicle; and
a sonar buoy operable to be launched from the launch tube, the sonar buoy comprising:
a fuselage having a tube-like shape;
one or more wings coupled to the fuselage and operable to be folded into a position to allow the sonar buoy to be disposed within the launch tube, the one or more wings further operable to automatically deploy to an appropriate position for flight after the sonar buoy is launched from the launch tube;
an engine operable to propel the sonar buoy through flight; and
a sonar coupled to the fuselage.

15. The system of claim 14, further comprising a guidance computer operable to direct the sonar buoy to a predetermined location.

16. The system of claim 14, wherein the vehicle comprises a vehicle that travels on water.

17. The system of claim 14, wherein the vehicle comprises a vehicle that travels on land.

18. The system of claim 14, wherein the one or more wings are detachably coupled to the fuselage and are operable to automatically detach from the fuselage after the sonar buoy lands in water.

19. The system of claim 14, wherein the sonar is detachably coupled to the fuselage, the sonar operable to detach from the fuselage on command.

20. The system of claim 14, further comprising a rocket motor detachably coupled to the sonar buoy and operable to:
propel the sonar buoy from the launch tube; and
detach from the sonar buoy after propelling the sonar buoy from the launch tube.

* * * * *